3,036,090
CATALYST AND PROCESS FOR PRODUCTION OF META-DIOXANES
Edward S. Wheeler, Secane, William K. Griesinger, Haverford, and Norbert H. Ellis, Philadelphia, Pa., assignors to The Atlantic Refining Company, Philadelphia, Pa., a corporation of Pennsylvania
No Drawing. Filed May 20, 1957, Ser. No. 660,050
1 Claim. (Cl. 260—340.7)

This invention relates to a catalyst and process for the production of meta-dioxanes from normally gaseous hydrocarbon streams. More particularly, it relates to a catalyst and process for producing 4,4-dimethyl-meta-dioxanes, 4,5-dimethyl-meta-dioxanes, alkyl and aryl substituted 4,4 and 4,5-dimethyl-meta-dioxanes, and mixtures of these dimethyl-meta-dioxanes.

It is known in the art that meta-dioxanes may be produced by reacting an olefin hydrocarbon with an aldehyde at temperatures from approximately 5° C. to 150° C. in the presence of an aqueous sulfuric acid catalyst ranging in concentration from about 2 to about 85 weight percent. Thus, isobutylene may be completely reacted with paraformaldehyde in from ½ to 1½ hours at temperatures between 50° to 60° C. in the presence of an aqueous sulfuric acid catalyst having a concentration of from about 10 to about 40 weight percent, preferably about 25 weight percent, to form 4,4-dimethyl-meta-dioxane and 2-methyl-2,4-butanediol as a by-product. Similarly, butene-2 may be completely reacted with paraformaldehyde in from ½ to 1½ hours at temperatures between 50° and 60° C. in the presence of an aqueous sulfuric acid catalyst having a concentration of about 43 to 60 weight percent to form 4,5-dimethyl-meta-dioxane, and 3-methyl-2,4-butanediol as a by-product.

It has been found, however, that a normally gaseous hydrocarbon stream containing mainly a mixture of $C_4$ paraffins and olefins, including isobutylene and butene-2, as well as some $C_3$ and $C_5$ paraffins and olefins, does not respond to an acid-catalyzed reaction with an aledehyde in the manner of either isobutylene or butene-2. It is theorized that the paraffins normally contained in the gas stream, such as n-butane, act as a solvent for the olefin and preclude sufficient contact between the olefin and the aqueous component. Consequently inordinately long and uneconomical reaction periods are required and frequently no reactions at all can be initiated. For example, neither the isobutylene nor the butene-2 in a butane-butene stream reacted with paraformaldehyde when heated at 55° C. for 4½ hours even when the concentration of $H_2SO_4$ was 45.5 weight percent. As pointed out above pure butene-2 alone will react completely under these conditions in from ½ to 1½ hours and pure isobutylene alone will react completely in a similar period even in the presence of a more dilute acid catalyst.

It is therefore an object of this invention to produce meta-dioxanes from normally gaseous hydrocarbon streams in an efficient and economical manner.

It is another object of this invention to produce a catalyst for the production of meta-dioxanes from normally gaseous hydrocarbon streams.

Further objects and advantages will be apparent from the description of the invention in the specification and from the appended claims.

It has now been discovered that a butane-butene gas stream may be reacted with an aldehyde in the presence of aqueous sulfuric acid in an efficient and economical manner by incorporating in the aqueous sulfuric acid solution a small amount of the products or by-products of the reaction, i.e. mainly the dimethyl-meta-dioxanes or 2,4-diols. It is believed that the products of the reaction act as a mutual solvent for the olefin and the aqueous layer since both the olefin and aqueous components are at least partially soluble in both dimethyl-meta-dioxanes and 2,4-diols. A closer contact between the reacting substances is thus obtained and the detrimental effect of the interfering paraffins is nullified.

In accordance with the present invention the isobutylene or the isobutylene and butene-2 contained in a normally gaseous hydrocarbon stream may be condensed with an aldehyde at temperatures of from approximately 30° C. to approximately 120° C., preferably from about 40° C. to about 100° C. in the presence of a catalyst which is comprised of a sulfuric acid solution ranging in concentration from about 2 to about 85 weight percent, preferably from about 10 to about 60 weight percent and an organic compound in which the aqueous and organic components are at least partially mutually soluble. A stoichiometric mole ratio of 2 moles of aldehyde per mole of olefin reacting may be used, although an excess of either olefin or aldehyde may also be used. The butene-1 in the hydrocarbon stream does not react under these conditions. A mole ratio of about 0.05 to about 0.5 mole of $H_2SO_4$ to aldehyde may be used. The aldehyde is charged to a suitable reaction vessel. The dimethyl-meta-dioxane, 2,4-diole or other organic mutual solvent is added to the sulfuric acid and the catalyst is added to the reaction vessel. The hydrocarbon gases are then added, preferably in the liquid state after being cooled, and the reactor is heated with agitation until the reaction is completed. The vessel is cooled and the organic and aqueous phases are separated. The unreacted hydrocarbons are evaporated from the organic phase. The aqueous phase is recycled to the next run and reacted with fresh aldehyde and hydrocarbons without additional sulfuric acid or organic mutual solvent.

Although many organic compounds which act as mutual solvents may be used it is preferred to use those organic compounds which are the reaction products and by-products of the particular reaction. This is especially advantageous on runs subsequent to the start-up procedure since this catalyst component is already present as a reaction product and may be conveniently recycled. Moreover, the use of other mutual solvents would present problems of removal in the subsequent utilization of the dioxanes as intermediates, such as in the production of isoprene. Thus, for example, in reacting the isobutylene and butene-2 in a butane-butene gas stream with formaldehyde or paraformaldehyde, 4,4-dimethyl-meta-dioxane and 4,5-dimethyl meta-dioxane are formed as the main products while 2-methyl-2,4-butanediol and 3-methyl-2,4-butanediol, respectively, are formed as by-products. Any one of these organic compounds or any combination of them in any proportion may be incorporated in the sulfuric acid solution for use as a catalyst in the olefin-aldehyde reaction. Similarly if the olefins are reacted with acetaldehyde, propionaldehyde or benzaldehyde the substituted dimethyl meta-dioxanes and their corresponding substituted 2,4-diols which are formed are the preferred organic compounds which are incorporated with the sulfuric acid solution to form the catalysts for the respective reactions.

The catalyst which forms a part of the instant invention may be prepared by incorporating in an aqueous sulfuric acid solution of from about 2 to about 85 weight percent concentration an organic compound in which the aqueous and organic reactants are at least partially soluble and preferably those meta-dioxanes and 2,4-diols and substituted meta-dioxanes and 2,4-diols having structural formulas which include the common grouping

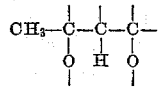

They may be prepared by reacting a pure olefin devoid of interfering substances with an aldehyde in the presence of an aqueous sulfuric acid catalyst in accordance with the prior art procedures mentioned heretofore. Any amount of these organic substances when added to the sulfuric acid solution will be effective in catalyzing the olefin-aldehyde reaction to some extent, the effect increasing with an increase in the concentration of the organic compound up to the limit of its solubility in the olefin and aqueous components. From about 5 to about 15 weight percent of the organic compound, based on the aldehyde, has been found to be satisfactory. The catalyst may also be prepared in situ by the process of the instant invention and may be utilized subsequent to start-up procedures by recycling the aqueous acid phase after separation from the organic phase since the aqueous phase is composed of a substantial amount, generally about 50 weight percent, of by-product 2,4-diols and also contains a small amount of the dioxanes. The aqueous phase may be recycled on each pass for use as a catalyst without the addition of $H_2SO_4$, dioxanes or 2,4-diols. However, it has been observed, when using formaldehyde or paraformaldehyde that after a period of continuous recycle the effectiveness of the catalyst gradually decreases due to the presence of water in these aldehydes and the consequent build-up of the aqueous phase. It was found however that this can be precluded by discarding the additional buildup from the recycle stream and reconcentrating the acid. In the case of paraformaldehyde for example, about 10% to about 13% by weight of the aqueous phase is discarded from the recycle stream and sufficient concentrated acid is added to bring the acid concentration up to its original level. The same effect is preferably and more economically obtained by vacuum distillation of the recycle stream to continuously reconcentrate the acid to the desired strength.

Examples of the 2,4-diols which may be added to $H_2SO_4$ to form the catalyst of the instant invention are 2-methyl - 2,4 - butanediol, 2-methyl-2,4-pentanediol, 2-methyl-2,4-hexanediol, 2-methyl-4-phenyl-2,4-butanediol, 3-methyl - 2,4 - butanediol, 3-methyl-2,4-pentanediol, 3-methyl-2,4-hexanediol, and 3-methyl-4-phenyl-2,4-butanediol.

The normally gaseous hydrocarbon stream from which the meta-dioxanes of the present invention are produced may be from either catalytic or thermal hydrocarbon refining unit streams or from a mixture of such streams. A typical analysis obtained by the mass and infra-red spectrometers of such a normally gaseous hydrocarbon stream resulting from both catalytic cracking and thermal cracking operations follows (in percent by weight):

| | |
|---|---|
| Propene | 1.5 |
| Propane | 0.9 |
| Isobutylene | 11.1 |
| Butene-2 | 10.7 |
| Butene-1 | 9.2 |
| Isobutane | 42.3 |
| n-butane | 22.0 |
| Pentene | 0.4 |
| Isopentane | 1.5 |
| $N_2$ | 0.4 |

The composition of the hydrocarbon gas stream may vary widely since any $C_3$ to $C_5$ gas stream, containing the necessary $C_4$ hydrocarbons, may be used to produce the meta-dioxanes.

Examples of meta-dioxanes which can be produced using the catalyst and process of the instant invention are 4,4-dimethyl-m-dioxane, 4,5-dimethyl-m-dioxanes, 4,4-dimethyl-2,6-diethyl-m-dioxane, 4,4-dimethyl-2,6-diphenyl-m-dioxane, 2,4,4,6-tetramethyl-m-dioxane, 2,4,5,6-tetramethyl-m-dioxane, 4,5-dimethyl - 2,6 - diethyl-m-dioxane, and 4,5-dimethyl-2,6-diphenyl-m-dioxane. These same meta-dioxanes may be incorporated in the sulfuric acid solution to form the catalyst of the instant invention.

Among the aldehydes that may be used are acetaldehyde, benzaldehyde, propionaldehyde, formaldehyde and substances yielding formaldehyde, such as paraformaldehyde and trioxane.

The meta-dioxanes produced by the catalyst and process of the instant invention may be used as solvents for resins and lacquers, as gasoline blending agents to impart antiknock properties, as solvents for dewaxing operations and as intermediates for the production of organic chemicals. As an example of their use as intermediates, they may be converted to diolefins by reaction with organic alcohols containing from 2 to 8 carbon atoms or with organic acids containing from 2 to 6 carbon atoms in the presence of a sulfuric acid catalyst. Isoprene, for instance, may be prepared from 4,4-dimethyl-meta-dioxane or 4,5-dimethyl-meta-dioxane by reaction with butanol, propanol, ethanol, acetic acid or propionic acid.

The instant invention may be better understood by reference to the following examples, which serve to illustrate the invention but are not intended to limit it thereto:

EXAMPLE I

Various hydrocarbon-aldehyde reactions were carried out in the manner described heretofore utilizing a refinery mixed $C_4$ stream, or C.P. grade olefins, or mixtures of C.P. grade olefins and C.P. grade n-butane, under the conditions set forth in Table I.

In run No. 1 C.P. grade isobutylene was reacted in the presence of 25 weight percent $H_2SO_4$. In run Nos. 2 and 3 an attempt was made to react the isobutylene in a refinery mixed butane-butene gas stream in the presence of 25 and 45.5 weight percent $H_2SO_4$, respectively. In run No. 4 the isobutylene in the refinery mixed $C_4$ stream was reacted in the presence of 26 weight percent $H_2SO_4$ containing 4,5-dimethyl-meta-dioxane. Butene-2 was reacted in run No. 5 in the presence of 43 weight percent $H_2SO_4$. In run No. 6 an attempt was made to react C.P. grade butene-2 to which C.P. grade n-butane was added, in the presence of 43 weight percent $H_2SO_4$. In run No. 7 the same reaction was carried out in the presence of 60 weight percent $H_2SO_4$ while in run No. 8 a similar mixture of C.P. grade butene-2 and C.P. grade n-butane was reacted in the presence of 50 weight percent $H_2SO_4$ containing 4,5-dimethyl-meta-dioxane. A refinery mixed $C_4$ stream was reacted with paraformaldehyde in two stages designated run Nos. 9 and 9a. In the first stage the isobutylene stream was reacted in the presence of 26 weight percent $H_2SO_4$ containing 4,5-dimethyl-meta-dioxane. After the isobutylene reacted the phases were not separated and the concentration of $H_2SO_4$ was increased to 55 weight percent to react the butene-2 in the second stage. Both the isobutylene and butene-2 in a refinery mixed $C_4$ stream were reacted in one stage in run No. 10 in the presence of 55 weight percent $H_2SO_4$ containing a mixture of 4,4 and 4,5-dimethyl-meta-dioxane. Run No. 11 was a repeat of run No. 10 using 2-methyl-2,4-butanediol instead of the mixed meta-dioxanes.

Table I

| Run Number | 1 | 2 | 3 | 4 | 5 | 6 | 7 | 8 | 9 | 9a | 10 | 11 |
|---|---|---|---|---|---|---|---|---|---|---|---|---|
| Paraformaldehyde (g.) | 5,443 | 1,134 | 1,134 | 28.0 | 180 | 90 | 72 | 72 | d 81.7 | | 84.5 | 84.5 |
| $H_2SO_4$ (g.) | 5,262 | 1,052 | 635 | 35.0 | 117 | 58 | 68 | 54 | 35.0 | e 59.5 | 60 | 60 |
| Conc. $H_2SO_4$ (wt. percent) | 25 | 25 | 45.5 | 26 | 43 | 43 | 60 | 50 | 26 | 55 | 55 | 55 |
| Hydrocarbons (g.) | a 7,311 | b 10,886 | b 10,886 | b 350 | a 255 | c 380 | c 304 | c 305 | b 350 | | b 350 | b 350 |
| Isobutylene (g.) | 7,311 | 1,542 | 1,542 | 38.8 | | | | | 38.8 | | 40.6 | 40.6 |
| Butene-2 (g.) | | | | | 255 | 125 | 100 | 100 | 37.5 | | 38.2 | 38.2 |
| n-Butane (g.) | | | | | | 255 | 204 | 205 | | | | |
| Mutual Solvent (g.) | 0 | 0 | 0 | f 11.5 | 0 | 0 | 0 | 0 | f 30 | f 11.5 | 0 | g 11.5 | h 11.5 |
| Reaction Temp. (° F.) | 90-120 | 90-115 | 120-130 | 120-134 | 130-145 | 120-148 | 120-136 | 120-137 | 120-140 | 126-140 | 140 | 140 |
| Reaction Time (hrs.) | ½ | 1¾ | 4½ | 1 | 1½ | 20 | 1½ | 2½ | 2½ | 4 | 4 |
| Wt. Organic Phase (g.) | 13,154 | No Reaction | No Reaction | 40 | 361 | No Reaction | 82.5 | 122.5 | | 90 | 113.3 | 110 |
| Wt. Aqueous Phase (g.) | 4,173 | | | 50.5 | 161.5 | | 110.5 | 87 | | 120 | 103.1 | 103.0 | a C.P. grade olefin.
b Refinery mixed $C_4$ stream.
c Mixture of C.P. olefin and C.P. n-butane.
d Amount sufficient to react both isobutylene and butene-2.
e Obtained by adding 24.5 g. of 96.2% $H_2SO_4$ to run 9.
f 4,5-dimethyl-meta-dioxane.
g mixed 4,4 and 4,5-dimethyl-meta-dioxane.
h 2-methyl-2,4-butanediol.

The results of these experiments prove the effectiveness of using the catalyst and process of the instant invention in reacting either the isobutylene or the isobutylene and butene-2 in a refinery mixed $C_4$ stream with an aldehyde. The pure isobutylene in run No. 1 reacted completely within ½ hour, while the isobutylene in the refinery mixed $C_4$ stream in run 2 did not react at all after 1¾ hours. Neither the isobutylene nor the isobutylene and butene-2 reacted in 4½ hours in run No. 3 even though the temperature was raised and the acid concentration increased to 43 weight percent. However, when 4,5 dimethyl-meta-dioxane was added in run No. 4 the reaction was complete after one hour, even at the lower acid concentration. Pure isobutylene alone reacted completely in 1½ hours in run No. 5 when 43 weight percent $H_2SO_4$ was used, but when pure n-butane was added to the C.P. butene-2 in run No. 6 no reaction occurred even after 20 hours and when the acid concentration was increased to as high as 60 weight percent in run No. 7 it took more than 5 hours before the reaction was even initiated. However, when 4,5-dimethyl-meta-dioxane was added in run No. 8 the reaction was complete after 1½ hours with only 50 weight percent $H_2SO_4$. These runs indicate that the interfering substances in the reaction of an aldehyde with the olefins of a refinery mixed $C_4$ stream are the paraffins and that their effect can be overcome by the use of the catalyst and process of the present invention. This is shown further in run Nos. 9 and 9a where the isobutylene in a refinery mixed $C_4$ stream was reacted in 2½ hours with 26 weight percent $H_2SO_4$ containing 4,5-dimethyl-meta-dioxane and then the butene-2 was reacted in a similar period by increasing the acid concentration to 55 weight percent without the addition of more mutual solvent. In run Nos. 10 and 11 both the isobutylene and butene-2 were reacted in one stage in 4 hours using a mixture of 4,4 and 4,5-dimethyl-meta-dioxane in run No. 10 and 2-methyl-2,4-butanediol in run No. 11.

EXAMPLE II

A refinery mixed $C_4$ stream was reacted with paraformaldehyde in two stages designated run Nos. 12 and 12a in Table II. In the first stage 4,5-dimethyl-meta-dioxane and 26 weight percent $H_2SO_4$ were used as the catalyst. After the isobutylene was completely reacted the concentration of the $H_2SO_4$ was raised to 55 weight percent in run No. 12a, and the butene-2 was then reacted. The reaction product was cooled and the aqueous and organic phases separated. The unreacted hydrocarbon gases were evaporated from the organic phase. The aqueous phase was recycled and used as the catalyst in run No. 13 without the addition of $H_2SO_4$ or meta-dioxane. The reaction in run No. 13 was carried out in one phase. The reaction product was separated and the aqueous phase recycled and used as the catalyst in run No. 14. The reaction in run No. 15 was carried out in the same manner as the previous run and used the aqueous phase of run No. 14 as the catalyst. The organic phase of run No. 15 was steam distilled and found to contain 71.5 percent of mixed 4,4-dimethyl-meta-dioxane and 4,5-dimethyl-meta-dioxane, 14 percent of mixed 2-methyl-2,4-butanediol and 3-methyl-2,4-butanediol and the remainder unreacted $C_4$ hydrocarbons and linear polyethers. Only 2.25 percent of the organic phase was not steam distillable or water soluble.

Table II

| Run number | 12 | 12a | 13 | 14 | 15 |
|---|---|---|---|---|---|
| Wt. paraformaldehyde a (g.) | 4,340 | | 4,340 | 2,565 | 3,740 |
| Wt. $H_2SO_4$ (g.) | 2,040 | | | | |
| Conc. $H_2SO_4$ (wt. percent) | 26 | b 55 | | | |
| Wt. Hydrocarbons (g.) c | 13,166 | | 13,166 | 13,166 | 13,166 |
| Wt. Iso-Butylene (g.) | 2,028 | | 2,028 | 1,870 | 1,922 |
| Wt. Butene-2 (g.) | 2,449 | | 2,449 | 1,804 | 1,935 |
| Wt. 4,5 DMDO d | 725 | | | | |
| Temp. (° F.) | 130-136 | 131-144 | 130-145 | 131-143 | 130-146 |
| Time (hrs.) | 1¼ | 1¼ | 2½ | 3 | 4 |
| Wt. Organic phase (g.) | | 6,390 | 7,201 | 5,602 | 6,508 |
| Wt. Aqueous phase (g.) | | 5,956 | 7,101 | 6,780 | 7,277 | a Based on 100 percent formaldehyde.
b Obtained by adding 1430 g. of 96.2% $H_2SO_4$ to run 1.
c Refinery mixed $C_4$ stream.
d 4,5 dimethyl-m-dioxane.

The results of this experiment prove that the catalyst and process of the instant invention are effective in producing meta-dioxanes from a refinery mixed butane-butene stream and that the catalyst formed in the start-up procedure may be reused in subsequent runs without the addition of fresh catalyst.

We claim:

In a process for the production of meta-dioxanes from a normally gaseous hydrocarbon stream containing butanes and at least one butene from the group consisting of isobutylene and butene-2 by reacting an aldehyde selected from the group consisting of formaldehyde, paraformaldehyde, trioxane, acetaldehyde, propionaldehyde, and benzaldehyde with said gaseous stream at a temperature of from approximately 30° C. to 120° C. in the presence of an aqueous sulfuric acid solution ranging in concentration from 2 to 85 weight percent to produce an organic liquid phase and an aqueous phase, separating the organic and aqueous phases, evaporating the unreacted butane-butene gases from the organic phase and recovering the organic phase, the improvement which consists of starting-up the reaction by incorporating into the sulfuric acid solution at least one organic compound in which the aqueous and organic components are at least partially soluble, said organic compound having a structural formula which includes the grouping

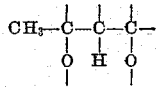

and is selected from the group consisting of 4,4-dimethyl-meta-dioxanes, 4,5-dimethyl-meta-dioxanes, 2-methyl-2,4-diols and 3-methyl-2,4-diols.

References Cited in the file of this patent
UNITED STATES PATENTS

| | | |
|---|---|---|
| 2,362,307 | Ritter | Nov. 7, 1944 |
| 2,721,223 | Arundale et al. | Oct. 18, 1955 |
| 2,962,507 | Hellin et al. | Nov. 29, 1960 |
| 2,997,480 | Hellin et al. | Aug. 22, 1961 |